(12) United States Patent
Van de Roer et al.

(10) Patent No.: US 11,985,747 B2
(45) Date of Patent: *May 14, 2024

(54) APPARATUS AND METHOD FOR FILMING A SCENE USING LIGHTING SETUPS ACTUATED REPEATEDLY DURING EACH ENTIRE FRAME WITHOUT VISIBLE FLICKER ON SET WHILE ACQUIRING IMAGES SYNCHRONOUSLY WITH THE LIGHTING SETUPS ONLY DURING A PORTION OF EACH FRAME

(71) Applicants: Carlo Van de Roer, Los Angeles, CA (US); Stuart Rutherford, New York, NY (US)

(72) Inventors: Carlo Van de Roer, Los Angeles, CA (US); Stuart Rutherford, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,949

(22) Filed: May 3, 2022

(65) Prior Publication Data

US 2023/0180372 A1 Jun. 8, 2023

Related U.S. Application Data

(63) Continuation-in-part of application No. 17/545,933, filed on Dec. 8, 2021, now abandoned.

(51) Int. Cl.
*H05B 47/155* (2020.01)
*H04N 23/56* (2023.01)
(Continued)

(52) U.S. Cl.
CPC ............ *H05B 47/155* (2020.01); *H04N 23/56* (2023.01); *H04N 23/74* (2023.01); *H04N 23/745* (2023.01)

(58) Field of Classification Search
CPC ......... H04N 5/2354; H04N 5/265; H04N 5/91
(Continued)

(56) References Cited

U.S. PATENT DOCUMENTS 3,499,707 A 3/1970 Brueckner
5,504,584 A 4/1996 Soeda
(Continued)

FOREIGN PATENT DOCUMENTS

| CN | 111818272 B | 9/2021 |
|---|---|---|
| JP | 2012227893 A | 9/2015 |
| JP | 2016086208 A | 5/2016 |

OTHER PUBLICATIONS

Website: https://www.shuttertalk.com/continuous-lighting-flash/ Downloaded Feb. 20, 2022 Using Continuous Lighting and Flash Together for Photography When, how, and why to use lighting and flash together. The combination of continuous and flash lighting can lead to some extraordinary photos. When it's set up correctly, your continuous light source will capture motion in your image, and the flash will capture a crisp image.

(Continued)

*Primary Examiner* — Lin Ye
*Assistant Examiner* — Chan T Nguyen
(74) *Attorney, Agent, or Firm* — RUSS WEINZIMMER + ASSOCIATES, PC

(57) ABSTRACT

Apparatus and method for filming a scene using a plurality of strobable lighting setups in rapid sequence to concurrently record a plurality of motion picture clips of the scene, one motion picture clip for each strobable lighting setup. The apparatus includes a plurality of strobable light sources that are coordinated to form the plurality of lighting setups, a controller to actuate the strobable lighting setups at a constant rate in a sequence that repeats multiple times during each macro frame, and a camera to capture a burst sequence (Continued)

of images within each macro frame. The burst sequence of images shows the scene illuminated by each one of the plurality of lighting setups in sequence during each macro frame. Since the constant rate is above the flicker threshold, people on set viewing the scene illuminated by the repeating sequence of strobable lighting setups perceive apparently continuous (non-flickering) illumination of the scene.

16 Claims, 12 Drawing Sheets

(51) Int. Cl.
    *H04N 23/74*     (2023.01)
    *H04N 23/745*     (2023.01)

(58) Field of Classification Search
    USPC .................................................. 348/222.1
    See application file for complete search history.

(56) References Cited

U.S. PATENT DOCUMENTS

| | | |
|---|---|---|
| 7,436,403 B2 | 10/2008 | Debevec |
| 8,477,205 B2 | 7/2013 | Kakinuma et al. |
| 9,100,581 B2 | 8/2015 | Wilburn et al. |
| 9,280,034 B2 | 3/2016 | Libreri et al. |
| 9,743,010 B1* | 8/2017 | Edwards .............. H04N 23/745 |
| 10,735,668 B2 | 8/2020 | Edwards |
| 11,089,207 B2 | 8/2021 | Wang |
| 2010/0049488 A1 | 2/2010 | Benitez et al. |
| 2011/0242334 A1* | 10/2011 | Wilburn ................... H04N 9/75 |
| | | 348/222.1 |
| 2013/0176481 A1* | 7/2013 | Holmes ................ H04N 23/667 |
| | | 348/370 |
| 2015/0062863 A1* | 3/2015 | Libreri ................... G03B 15/02 |
| | | 362/11 |
| 2015/0268172 A1* | 9/2015 | Naithani ............... B61L 23/047 |
| | | 348/129 |
| 2015/0271462 A1 | 9/2015 | Kobayashi et al. |
| 2018/0213195 A1 | 7/2018 | Junuzovic et al. |
| 2019/0141223 A1* | 5/2019 | Van de Roer .......... H04N 23/56 |
| 2021/0344829 A1 | 11/2021 | Bessou et al. |

OTHER PUBLICATIONS

Website: Anti flicker lighting for film and video light—High CRI Light (mmsvideolight.com) Downloaded Feb. 20, 2022 Anti-Flicker Lighting Solution for Film and Video Lighting What is flicker and how to eliminate it.

Youtube: https://www.youtube.com/watch?v=UfPPfOLXZUw Downloaded Feb. 19, 2022 Adobe Premiere Pro CC Tutorial: Strobe Light & Flicker Transition Effect.

* cited by examiner

APPARATUS AND METHOD FOR FILMING A SCENE USING LIGHTING SETUPS ACTUATED REPEATEDLY DURING EACH ENTIRE FRAME WITHOUT VISIBLE FLICKER ON SET WHILE ACQUIRING IMAGES SYNCHRONOUSLY WITH THE LIGHTING SETUPS ONLY DURING A PORTION OF EACH FRAME

CROSS-REFERENCES TO RELATED APPLICATIONS

The present Continuation-in-Part Applications claims priority to application Ser. No. 17/545,933, filed 8 Dec. 2021, titled "APPARATUS AND METHOD FOR RECORDING A SCENE FOR A PLURALITY OF LIGHTING SETUPS USING A VARIABLE FRAME RATE CAMERA TO CAPTURE MICRO FRAMES DURING ONLY A PORTION OF EACH CINEMATIC FRAME", herein incorporated by reference in its entirety.

FIELD OF THE INVENTION

This invention relates generally to filming scenes with a camera capable of rapidly acquiring images using a plurality of lighting setups, and particularly to producing motion picture footage of a scene for each of a plurality of lighting setups.

BACKGROUND OF THE INVENTION

When filming with multiple lighting setups (Van de Roer et al., U.S. Pat. No. 11,258,950 B1), one of two approaches were used:

Each lighting setup was fired (strobed) in sync with each camera micro frame (image capture) to have one of the various lighting setups fire during a corresponding image capture micro frame. To maximize the length of the take, Van de Roer, et al made each macro frame $\frac{1}{24}$th of second in duration. This meant that all lighting setups fired in a burst sequence every 24th of a second at the beginning of each macro frame. This maximized the take length (as it uses less frames per second), but resulted in very obvious flicker visible to anyone in the area of the lights because the lighting setups were effectively strobing together at 24 Hertz.

Alternatively, the lighting setups were strobed in sync with the camera image capture frames to have the various lighting setups fire within the correct camera image capture frame. To eliminate any obvious flicker perceived by those present during shooting, Van de Roer, et al made each macro frame $\frac{1}{96}$th of a second in length. Although the lights didn't appear to flicker at all, the take lengths were only a quarter of what they were when the macro frame was $\frac{1}{24}$th of a second in length, which was unacceptable.

Recent testing showed that a strobing light could be perceived to be flickering if it strobed at any rate under approximately 80-90 Hertz.

In the past, experts maintained that most people's ability to detect flicker occurred between 50 and 90 Hz. Flicker can be distracting if you can perceive the flicker rate, rather than seeing one continuous stream of light and images.

Recent testing also found that perception of flickering was particularly uncomfortable when a light source strobed at a rate of 24 Hertz (strobes per second), which is much less than 90 Hertz. This may be because 24 Hertz is near the range where 'flicker vertigo' (a feeling of dizziness caused by seeing flickering strobable lights) can occur. In fact, from 1-20 Hertz, humans are susceptible to "flicker vertigo".

SUMMARY OF THE INVENTION

The apparatus and method of the invention employs a camera configured to rapidly acquire a sequence of images (also called "micro frames") only during a portion of each cinematic frame, (also called a "macro frame"), thereby efficiently recording a scene with multiple lighting setups, all in one "take", while reducing or eliminating flicker of each of the lighting setups visible to persons on set during filming. The images of each sequence of images are acquired at a rate called the "global frequency". The apparatus and method of the invention also retain the ability to perform long takes because the number of rapidly acquired image captures per macro frame is less than the number of illuminations of the lighting setups per macro frame.

The lighting setups and the camera are in sync during bursts of rapid image capture, but according to the invention, the lighting setups continue to strobe sequentially for the remaining duration of each macro frame at the same rate as during the bursts of rapid image capture. Each lighting setup strobes at a fraction of the global frequency, the fraction being the inverse of the number of lighting setups in the sequence of lighting setups used to acquire the sequence of images each macro frame. Thus, according to the invention, each lighting setup strobes at a constant rate during each macro frame of the take, and since the constant strobe rate of each lighting setup is above the flicker threshold, viewers on set perceive each of the lighting setups as continuous (non-flickering) light sources. Thus, the problem previously experienced when the lighting set-ups were strobed only during a portion of each micro frame, i.e., the lighting setups appeared to be flickering on set during filming, has been solved.

The invention allows a scene to be filmed using multiple lighting setups in rapid sequence, the sequence repeating one or more times within each macro frame, thereby eliminating flicker visible to those directly observing the scene, while also allowing take times that are much longer than simple multiplexed lighting setups.

The invention acquires a sequence of images ONLY during a beginning portion of each macro frame at the global rate, while also firing a sequence of lighting setups synchronized with that global rate at the beginning of the macro frame, and then repeatedly fires the sequence of lighting setups without acquiring any images until the end of the macro frame. This avoids acquiring unnecessary micro frames, while also preventing perceived flicker by firing each of the lighting setups at a rate that is high enough to effectively eliminate perceived flicker.

To eliminate flicker when using multiple lighting setups, each of the lighting setups are run at a rate greater than 70 Hertz. Since the lighting setups are synchronized with the camera (macro) frames, this would have previously meant making each macro frame have a matching duration of $\frac{1}{70}$th of a second, or less. However, this would result in too many camera (macro) frames. The camera typically runs at an effective frame rate of 24 Hertz (where the duration of each macro frame is $\frac{1}{24}$th of second).

According to the invention, in one embodiment, the camera can run at an effective rate of 24 Hertz, and the lights can run at a global rate of 96 Hertz (4 times the effective rate of the camera), the camera and the lights being kept in sync.

For this example, the duration of each macro frame is 1/24th of a second, and each lighting setup will fire four times during each macro frame.

Thus, each lighting setup fires as part of a sequence of lighting setups at a rate that is a fraction 1/S of the global rate, where S is the number of lighting setups. Only the first repetition of the sequence of lighting setup firings will occur in synchrony with the image captures (micro frames) of a macro frame. The other repetitions of the sequence will occur during the part of the macro frame where there are no image captures (micro frames).

The apparatus of the invention enables illumination and recording of a scene such that multiple lighting setup illuminations of the scene can be captured within each macro frame using a digital cinema camera capable of recording micro frames only during a portion of each macro frame. Each such micro frame corresponds to a respective lighting setup.

Each of the lighting setups is recorded as a micro frame image data capture of the same scene. The sequence of micro frames has negligible motion offset because the micro frames are captured so rapidly in a burst of a duration substantially less than a macro frame such that the scene does not appreciably change while the micro frames are being captured during each macro frame.

"Motion offset" refers to apparent motion of an object in the scene upon transition from a micro frame illuminated by a first lighting setup to a micro frame illuminated by a subsequent lighting setup. Motion offset can also refer to the separation distance between a first image of the object due to a first lighting setup and a later image of the object due to a later lighting setup, when the first and later images are de-multiplexed and included in a cinematic frame sequence.

Because the micro frames are captured as part of a sequence of micro frames of substantially short time duration relative to each macro frame, the benefits of the invention include minimized motion offset, thereby substantially minimizing the need to employ complex optical flow algorithms to remove motion artifacts.

The micro frames captured during a portion of the time interval of each cinematic frame (macro frame), are captured together in a sequence of short time duration compared to the duration of a cinematic frame (macro frame). Because the camera records a sequence of micro frames only during a limited duration of each cinematic frame (macro frame), the image data stored is less than the image data that must be stored when recording micro frames continuously during an entire cinematic (macro) frame.

In addition, the positions of the light sources are not constrained, permitting more creative expression via freedom to place each light source where needed or desired, thereby facilitating rapid setup and consequent reduced time, difficulty, and expense of filming.

Further, the apparatus of the invention enables use of industry-standard lighting equipment, as well as non-standard lighting equipment.

The plurality of lighting setups is sequentially captured using at least one different light source and also possibly different camera settings for each micro frame within each macro frame being recorded by the camera. A controller (that is configurable via software) detects the micro frames being recorded by the camera, and triggers the corresponding lights of respective lighting setups on specific respective micro frames to record the plurality of different lighting setups. The camera can also be set up (either using a control menu on the camera, or via an API) to have different settings for each micro frame within a macro frame.

Once the micro frame image data has been recorded, the micro frames of each macro frame can be separated into a plurality of respective sets of micro frames, each set corresponding to one of the plurality of lighting setups. Each set of micro frames for a particular lighting setup can then be processed and output as an individual clip consisting of a sequence of cinematic frames (macro frames), thereby providing one complete clip of the same scene for each lighting setup of the plurality of lighting setups.

There will be at least one synced light source in each lighting setup, but there can be more than one synced light source, and there can be synced light sources in more than one lighting setup, or even in all lighting setups. Additionally, the lighting setups can change from one micro frame to the next micro frame. For example, one or more light sources can be dimmed, and/or the lighting level can be brought up during the capture of the micro frames. The same light source can be used for more than one setup, and additionally the level of this light source can be changed per micro frame.

A plurality of groups/sets of light sources are first positioned in the desired locations, and configurable software in the controller then controls which light sources are fired for each micro frame that is recorded by the camera. Each of the plurality of lighting setups is fired for each cinematic frame. The micro frames corresponding to the lighting setups in each cinematic frame can then be extracted from the entire cinematic frame sequence to create a set of clips of footage. Each clip of footage shows the scene under one lighting setup. These clips of footage can be combined in post-processing for creative or technical flexibility and efficiency.

The invention can be used to concurrently record a plurality of lighting setups of live action which can be used as separate clips of footage. For example:

Lighting representative of different times and places.
Each of the various lights required to light a single scene.
Scene lighting and VFX lighting for tracking, chroma key, or effects.
Different creative lighting set-ups.

A general aspect of the invention is an apparatus for filming a scene using a sequence of lighting setups so as to acquire simultaneously a respective plurality of motion picture clips of the scene, such that on-set viewers of the scene perceive apparently continuous (non-flickering) illumination. The apparatus includes: a plurality of strobable light sources, each strobable light source configured to be capable of illuminating at least part of the scene; a camera configured to capture a burst sequence of images at a global frequency, the global frequency being a product of the number of lighting setups, the number of repetitions of each lighting setup per macro frame, and the number of macro frames per second, each image of the sequence of images being captured during a respective micro frame of a sequence of micro frames, each sequence of micro frames occurring within only a part of each macro frame of a sequence of macro frames, each micro frame initiated by a micro frame timing signal, and each image of the sequence of images resulting from illuminating the scene with a respective lighting setup of a sequence of lighting setups; and a controller configured to: enable a user to define a plurality of lighting setups using the plurality of light sources, and actuate the plurality of lighting setups in accordance with the micro frame timing signals so as to first actuate a sequence of lighting setups in synchrony with the sequence of micro frames within each macro frame, and then repeating the sequence of lighting setups for the remainder of each macro frame.

In some embodiments, each sequence of micro frames is of a duration of no more than substantially 21 milliseconds.

In some embodiments, the GLOBAL frequency is greater than 70 Hertz, and each sequence of lighting setups is actuated at the GLOBAL frequency more than once throughout each macro frame, thereby substantially eliminating flicker visible to persons viewing the scene on set during filming.

In some embodiments, the duration of the macro frame is 1/24th of a second, and each micro frame corresponding to a lighting setup can be used to create footage with an apparent 24 fps capture speed.

In some embodiments, the duration of the macro frame is 1/48th of a second, and each micro frame corresponding to a lighting setup can be used to create footage with an apparent 48 fps capture speed.

In some embodiments, the duration of the macro frame is 1/Nth of a second, and each micro frame corresponding to a lighting setup can be used to create footage with an apparent N fps capture speed.

In some embodiments, the camera is configured to capture at least one long micro frame after capturing the sequence of micro frames, the long micro frame being of an extended duration configured to capture light from a continuous light source.

In some embodiments, the apparatus further includes: a processing module configured to assemble a plurality of motion picture clips, each motion picture clip assembled from a sequence of corresponding micro frames of the sequence of macro frames, each motion picture clip corresponding to one of the lighting setups.

In some embodiments, the controller is configured to actuate the plurality of lighting setups in sequence in accordance with the micro frame timing signals, such that a first lighting setup of the plurality of lighting setups is actuated by a micro frame timing signal upon a beginning of a macro frame, and a last lighting setup of the plurality of lighting setups is actuated by a micro frame timing signal such that the last lighting setup will go dark before an end of the macro frame.

Another general aspect of the invention is a method for filming a scene using a sequence of lighting setups so as to acquire simultaneously a respective plurality of motion picture clips of the scene, such that on-set viewers of the scene perceive apparently continuous (non-flickering) illumination. The method includes: using a plurality of strobable light sources to illuminate at least part of the scene; using a camera to capture a burst sequence of images at a global frequency, the global frequency being a product of the number of lighting setups, the number of repetitions of each lighting setup per macro frame, and the number of macro frames per second, each image of the sequence of images being captured during a respective micro frame of a sequence of micro frames, each sequence of micro frames occurring within only a part of each macro frame of a sequence of macro frames, each micro frame initiated by a micro frame timing signal, and each image of the sequence of images resulting from illuminating the scene with a respective lighting setup of a sequence of lighting setups; and using a controller to: enable a user to define a plurality of lighting setups using the plurality of light sources, and actuate the plurality of lighting setups in accordance with the micro frame timing signals so as to first actuate a sequence of lighting setups in synchrony with the sequence of micro frames within each macro frame, and then repeating the sequence of lighting setups for the remainder of each macro frame.

In some embodiments, each sequence of micro frames is of a duration of no more than substantially 21 milliseconds.

In some embodiments, the GLOBAL frequency is greater than 70 Hertz, and each sequence of lighting setups is actuated at the GLOBAL frequency more than once throughout each macro frame, thereby substantially eliminating flicker visible to persons viewing the scene on set during filming.

In some embodiments, the duration of the macro frame is 1/24th of a second, and each micro frame corresponding to a lighting setup can be used to create footage with an apparent 24 fps capture speed.

In some embodiments, the duration of the macro frame is 1/48th of a second, and each micro frame corresponding to a lighting setup can be used to create footage with an apparent 48 fps capture speed.

In some embodiments, the duration of the macro frame is 1/Nth of a second, and each micro frame corresponding to a lighting setup can be used to create footage with an apparent N fps capture speed.

In some embodiments, the camera captures at least one long micro frame after capturing the sequence of micro frames, the long micro frame being of an extended duration configured to capture light from a continuous light source.

In some embodiments, the method further includes: using a processing module to assemble a plurality of motion picture clips, each motion picture clip assembled from a sequence of corresponding micro frames of the sequence of macro frames, each motion picture clip corresponding to one of the lighting setups.

In some embodiments, the controller actuates the plurality of lighting setups in sequence in accordance with the micro frame timing signals, such that a first lighting setup of the plurality of lighting setups is actuated by a micro frame timing signal upon a beginning of a macro frame, and a last lighting setup of the plurality of lighting setups is actuated by a micro frame timing signal such that the last lighting setup will go dark before an end of the macro frame.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
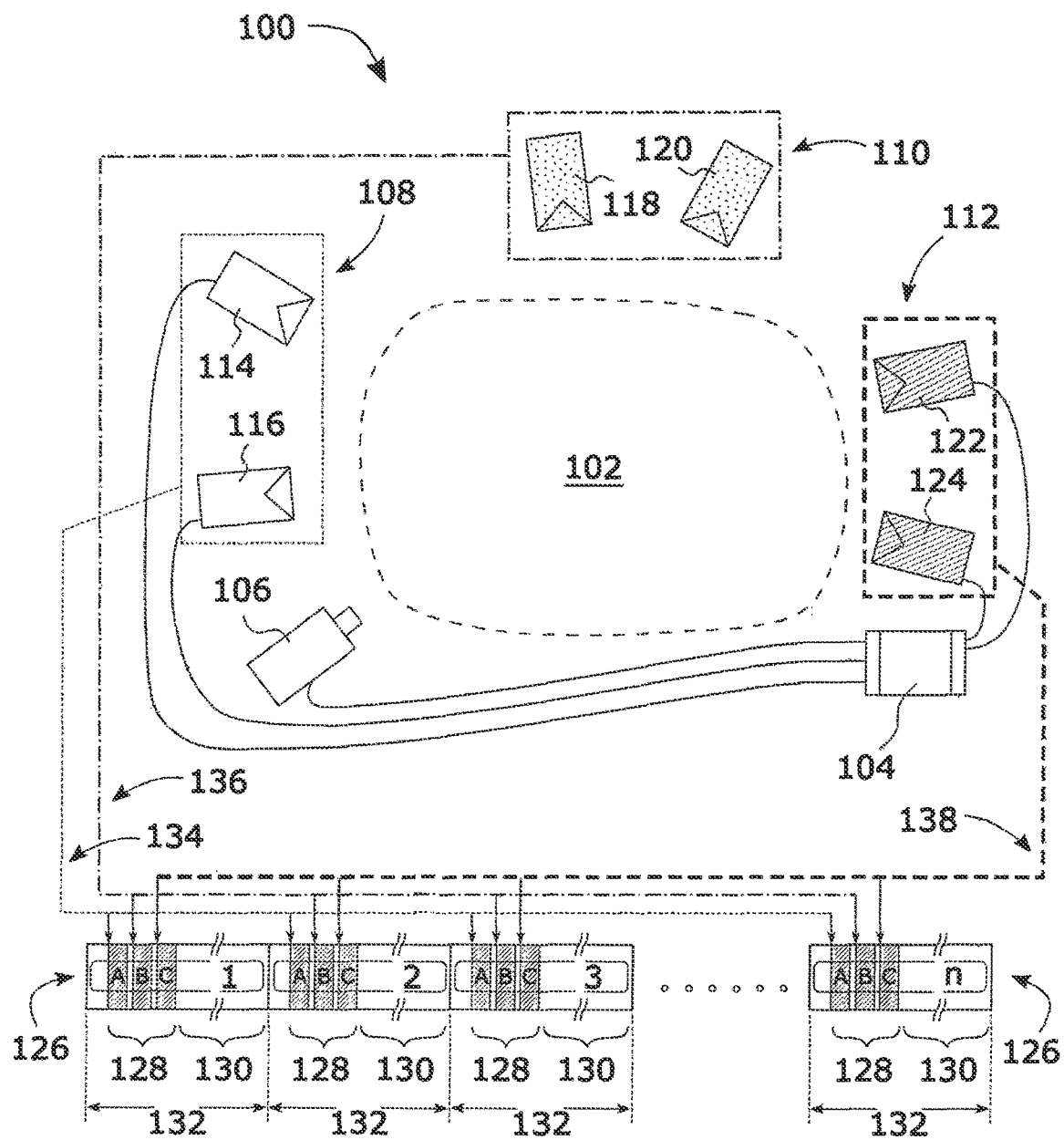
FIG. 1 is a schematic diagram of a scene illuminated sequentially by three lighting setups, each lighting setup having two strobable lights, using a sequence of three micro frames with minimal motion offset corresponding to the three lighting setups, each lighting setup being controlled by a controller that receives timing signals from a camera recording the scene, also showing a frame sequence diagram of a corresponding macro (cinematic) frame sequence, each macro frame having three micro frames and no long frame.

With reference to FIG. 1, a schematic diagram is presented of an apparatus 100 for illuminating and recording a scene 102 using three lighting setups 108, 110, 112. In this embodiment 100, each lighting setup 108, 110, 112 has two light sources that are capable of providing strobed light. The apparatus 100 includes a controller 104 in communication with a camera 106 configured to record the scene 102.

The controller 104 is also in communication with lighting equipment consisting of: a light source 114, a light source 116, a light source 118, a light source 120, a light source 122, and a light source 124. The light sources are grouped into three lighting setups: a first lighting setup 108 consisting of light source 114 and light source 116, a second lighting setup 110 consisting of light source 118 and light source 120, and a third lighting setup 112 consisting of light source 122 and light source 124.

Each light source that is capable of providing strobed light can be one or more LEDs, or a Xenon strobable light, or other light source that can be switched on and off relatively rapidly, i.e., any light source that can exhibit strobe light behavior.

Flash duration of a light source is commonly described by two numbers that are expressed in fractions of a second:
  t.1 is the length of time the light intensity is above 0.1 (10%) of the peak intensity.
  t.5 is the length of time the light intensity is above 0.5 (50%) of the peak intensity.

For example, a single flash event might have a t.5 value of $1/1200$ and a t.1 value of $1/450$. These values determine the ability of a flash to "freeze" moving subjects in applications such as sports photography.

Individual strobe light flashes typically last approximately 200 microseconds, i.e., 0.2 milliseconds, i.e., ⅕ of a millisecond, but can be sustained for greater or lesser periods of time, depending on the strobe light's intended use.

Here are some time durations for comparison:
  0.2 milliseconds—duration of a typical strobable flash
  1 millisecond (1 ms)—duration of a typical photo flash.
  2 milliseconds to 5 milliseconds—typical response time in LCD computer monitors, especially high-end displays
  8 milliseconds—$1/125$ of a second, a standard still camera shutter speed (125)
  16.68 milliseconds (1/59.94 second)—the amount of time one field lasts in
  29.97 fps interlaced video (commonly but erroneously referred to as 30 fps)
  33.367 milliseconds—the amount of time one frame lasts in 29.97 fps video (most common for NTSC-legacy formats)
  41.667 milliseconds—the amount of time one frame lasts in 24 fps video (most common cinematic frame rate)

41.708 milliseconds—the amount of time one frame lasts in 23.976 fps video (cinematic frame rate for NTSC-legacy formats)

134 milliseconds—the time taken by light to travel around the Earth's equator 200 milliseconds—the time it takes the human brain to recognize emotion in facial expressions 300 to 400 milliseconds—the time for the human eye to blink 1000 milliseconds—the time for one second to pass.

The camera 106 records the action in scene 102 as a sequence of macro frames 126. Each macro frame 132 of the sequence 126 can be a cinematic frame with a duration of 41.6667 milliseconds, or $\frac{1}{24}^{th}$ of a second. However, each macro frame 132 may be of a longer or shorter duration, depending on the desired cinematic film rate.

In some embodiments, the camera can be a variable frame rate camera. The variable frame rate camera can be configured to record during only a portion 128 of each macro frame 132, the portion 128 corresponding to the duration of the sequence of micro frames A, B, C relative to the total duration 128 and 130 of the macro frame. The variable frame rate camera can also be configured to not record during the remainder 130 of the duration 132 of each macro frame. Alternatively, the variable frame rate camera can be programmed to define at least one long frame as a "throw away" frame, to define a time period during the macro frame where the image data is not needed for post-processing. The long frame can also be used to capture continuous light from a continuous light source, as will be explained with reference to FIG. 3 below.

Figure 3:
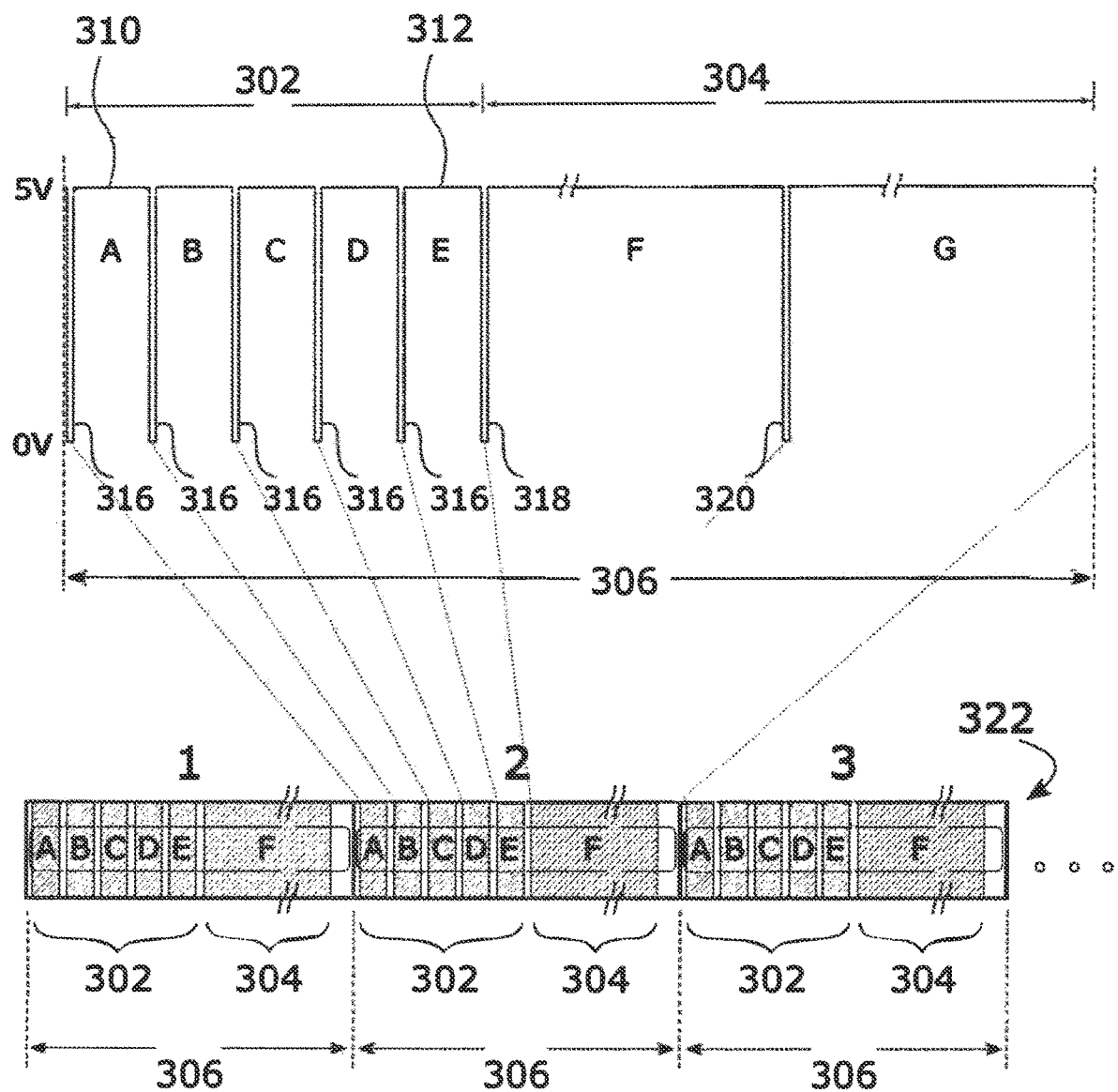
FIG. 3 is a frame sequence diagram of a sequence of three macro frames, each macro frame including a sequence of five micro frames followed by one or two optional long frames, each micro frame for capturing light from a strobable lighting setup, and each long frame for capturing light from a continuous light source, where one macro frame is expanded into a corresponding timing diagram showing five micro frame low trigger signals, and two long frame low trigger signals.

The variable frame rate camera can be programmed to precisely change the frame rate within the duration of each macro frame. For example, a variable frame rate camera can be programmed to record a 400 microsecond micro frame duration, followed by a much longer 40,000 microsecond long frame duration within the same macro frame, as shown in FIG. 3, for example.

Some examples of variable frame rate cameras are in the Vision Research Phantom V® series of cameras, featuring Burst Mode Acquisition, which are capable of capturing a sequence of micro frames in a short duration burst, each burst being triggered within each much longer duration macro frame.

In some embodiments, the camera can also be a constant frame rate camera, if the constant frame rate camera can be configured to record during only a portion of each macro frame, the portion corresponding to the duration of the sequence of micro frames relative to the total duration of the macro frame. The constant frame rate camera can be configured to not record during the remainder of the duration of each macro frame after the burst of micro frames.

As shown in FIG. 1, the camera 106 can be a camera with a variable frame rate that is configured to record a sequence of three micro frames 128, each of short duration, followed by at least one long frame 130 of long duration, to form one macro frame 132. (The one long frame 130 is shown with a broken boundary, indicating that this long frame 130 is much longer in duration than the sequence of three micro frames 128.) Because the sequence of three micro frames 128 is of short duration, there is minimal motion offset within the sequence of three micro frames 128.

In this embodiment, every macro frame 132 of the sequence of macro frames 126 includes a sequence of three micro frames 128 and one long frame 130.

In other embodiments, the number and/or position of the micro frames can be different. For example, in another embodiment, each macro frame can include one long frame followed by a sequence of six micro frames that are of short duration (not shown).

Under control of the controller 104, the scene 102 is sequentially illuminated by the first lighting setup 108, then the second lighting setup 110, and then the third lighting setup 112. The first micro frames A 134 record the scene 102 illuminated by the first lighting setup 108, the second micro frames B 136 record the scene 102 illuminated by the second lighting setup 110, and the third micro frames C 138 record the scene 102 illuminated by the third lighting setup 112.

Lighting intervals A, B, and C are shown indicating the duration of the three micro frame time intervals within the sequence 128 of three micro frames, lighting intervals A, B, and C corresponding to: the first micro frames 134, the second micro frames 136, and the third micro frames 138, respectively.

The controller 104 controls the timing of the lighting intervals A, B, and C within the sequence of the three micro frames 128, and the timing of the long frame 130 (1, 2, 3, . . . n). The lighting intervals A, B, and C are chosen to be in sequence, and short in duration, such that the illumination from the first lighting setup 108, the illumination from second lighting setup 110, and the illumination from the third lighting setup 112 provide minimal motion offset between micro frames corresponding to the three lighting setups.

Each macro frame 132 of the macro frame sequence 126 includes three micro frames 128 corresponding to each of the three lighting setups. The first micro frames 134 (corresponding to the A's) correspond to the first lighting setup 108, the second micro frames 136 (corresponding to the B's) correspond to the second lighting setup 110, and the third micro frames 138 (corresponding to the C's) correspond to the third lighting setup 112.

In some embodiments, the controller 104 is configured to enable the user to include at least one camera parameter that can change for each micro frame, and sequentially actuate the at least one camera parameter for each of the micro frames in accordance with timing signals derived from a micro frame rate of the camera 106. For example, the at least one camera parameter can include at least one of: sensitivity (ISO); aperture; ND (neutral density filter); and shutter angle.

One of average skill in the art will know that it is also possible to replace the controller 104 with a plurality of dedicated controllers, each controller dedicated to controlling a single light, or a single lighting setup. Alternatively, a controller could be built into each light. In these embodiments, each dedicated controller can execute software to control a specific light or lighting setup, and the camera could provide control signals to actuate each dedicated controller.

Figure 2:
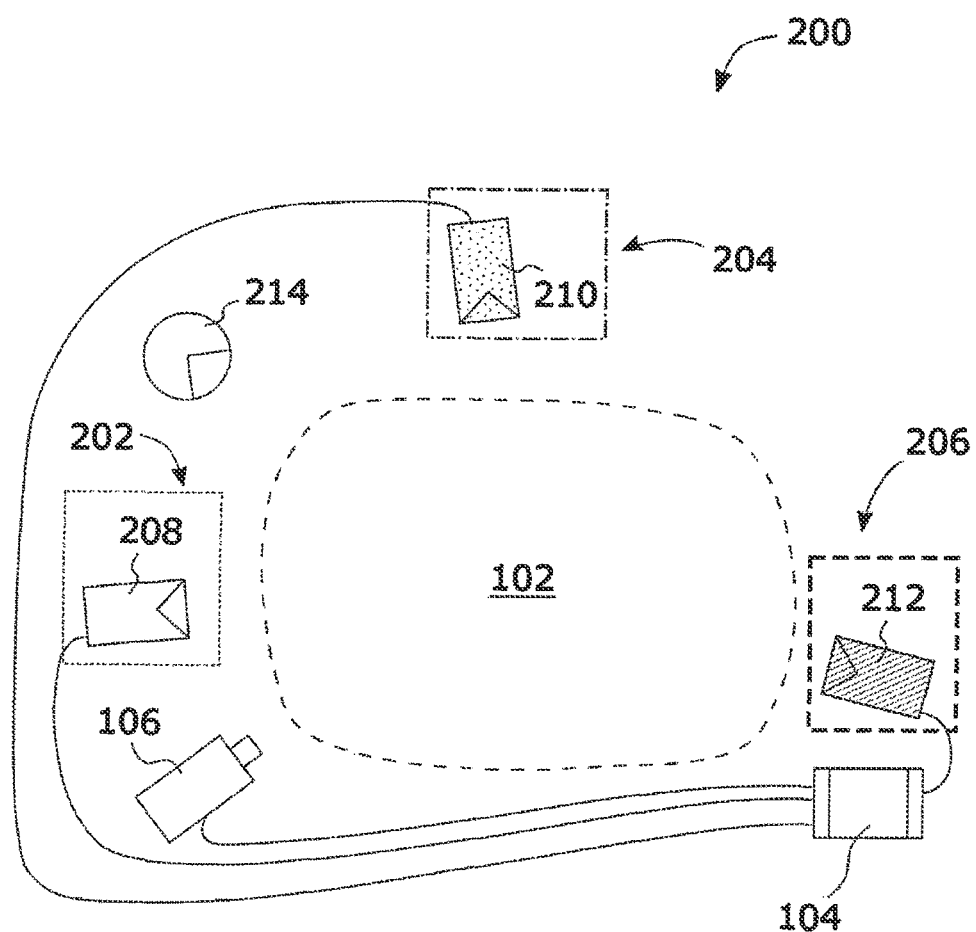
FIG. 2 is a schematic diagram of a scene illuminated sequentially by three lighting setups, each lighting setup being a single strobable light, also including a continuous light source, each lighting setup and the continuous light source being controlled by a controller that receives timing signals from a camera recording the scene.

With reference to FIG. 2, a schematic diagram of a top view of a scene lit with one continuous light source 214 and three strobable light sources 208, 210, 212 is shown of an apparatus 200 for recording a scene 102 using multiple lighting setups. The lighting is divided into three lighting setups 202, 204, 206, each of the lighting setups having one light source: the first lighting setup 202 having the light source 208, the second lighting setup 204 having the light source 210, and the third lighting setup 206 having the light source 212.

Also included is the controller 104 in communication with the camera 106, which is configured to record the scene 102. The controller 104 synchronizes operation of the camera 106 with activation of the lighting setups 202, 204, and 206, each lighting setup providing short duration illumination for the scene 102.

In this embodiment, a continuous light source 214 provides constant illumination for the scene 102.

With reference to FIG. 3, a timing diagram of macro frame 306 having a burst sequence of five micro frames A, B, C, D, E 302, followed by two long frames F, G 304, within a macro frame 306 is shown. The sequence of five micro frames A, B, C, D, E 302 begins with a first micro frame A 310, and ends with a last micro frame E 312. The macro frame 306 is one of a series of macro frames (1, 2, 3) 322, where the macro frame (2) is shown enlarged above the series of macro frames (1, 2, 3) 322.

In this embodiment, the signal voltage alternates between the two binary states of 5.0 volts and 0.0 volts, for example, to provide low trigger signals 316, 318, and 320. In this embodiment, the low trigger signals 316, 318, 320 come from the camera in accordance with a micro frame rate of the camera, and are provided to the controller 104 to activate in sequence seven different lighting setups, for example.

In some embodiments, an external timing source sends a timing signal to the camera.

In other embodiments, an external timing source sends a timing signal to both the camera and to a light controller, or directly to a plurality of lighting setups.

A low-going transition of 5V to 0V represents a trigger signal. Examples of these are the micro frame low trigger signals 316 that start each of the five micro frames A, B, C, D, E, and the long frame low trigger signals 318 and 320. In other embodiments, a high-going transition from 0V to 5V represents a trigger signal.

In this embodiment, the first low trigger signal 316 starts the first micro frame A 310, and the sixth low trigger signal 318 starts the first long frame F, followed by the seventh low trigger signal 320 that starts the second long frame G. The long frames F and G together form the long interval 304. One or both long frames F and G can be used to capture light from a scene illuminated by a continuous light source, such as the continuous light source 214 of FIG. 2 that provides constant illumination for the scene 102.

Regarding F and G, after the short micro frames A, B, C, D, E 316 there are long micro frames F and G which occupy the remaining portion 304 of the macro frame 306. These additional frames F and G can be recorded, or not. When recorded, the long frames F and/or G are typically used to record ambient exposure from the continuous light source(s) 214, or any other continuous light source, including daylight, for example.

The duration of F or G 304 of the macro frame 306 is the product of the macro frame duration 306 and a shutter angle. In this context, the shutter angle is defined as the ratio of the duration of F or G of the macro frame 304 to the duration of the entire macro frame 306. For example, if macro frame 306 is ¹⁄₂₄th of a second, and the shutter angle is 180 degrees (which is half of the overall frame 306), F or G is ¹⁄₄₈th of a second.

Two possible cases with long frames F and G, for example:
Case 1:
Duration of micro frames 302+Duration of F=(Macro Frame Duration 306)/2
Duration of G=(Macro Frame Duration 306)/2
Case 2:
Duration of micro frames 302+Duration of G=(Macro Frame Duration 306)/2
Duration of F=(Macro Frame Duration 306)/2

One possible case with a single long frame F only, for example:
Duration of micro frames 302+Duration of F=Macro Frame Duration 306

Thus, there can be a long frame F wherein ambient continuous light is captured, and there can be a long frame G wherein ambient continuous light is captured. It is also possible that there are no long frames F or G, and the camera does not record light during 304, only during 302. It is also possible for ambient continuous light to be captured during a long frame F, and there would be no long frame G.

This embodiment includes five micro frame low trigger signals A, B, C, D, E 316 that the camera 106 sends to the controller 104 (shown in FIG. 1) at the beginning of each micro frame A, B, C, D, and E. In this embodiment, these five micro frame low trigger signals A, B, C, D, E 316 communicate to the controller 104 the timings to activate in sequence five different lighting setups.

Also shown are the long frame low trigger signals 318 and 320, which mark the start of the optional frames F and G of the remaining portion 304, during which continuous lighting can be recorded, such as the continuous lighting starting at the long frame low trigger signal 318 and ending at the long frame low trigger signal 320.

The micro frame low trigger signals 316 and the long frame low trigger signals 318 and 320 can be short in duration, such as 1 microsecond, for example. Alternatively, each trigger signal can be the duration of the respective micro frame or of the respective long frame exposure duration.

In some embodiments a variable frame rate camera can be programmed to define the remaining portion 304 as a "throw away" frame, used to exclude from recording many frames during the macro frame 306 where that image data is not needed for post-processing. This partial frame recording greatly reduces image data storage requirements (versus storing high speed image data and continuous illumination data throughout the entire duration 306 of the macro frame).

Typically, a macro frame 306 includes one to ten micro frames 302. The most useful range is from one to thirty micro frames per macro frame. FIG. 3 shows an example where each macro frame 306 includes a burst sequence 302 of five micro frames A, B, C, D, and E of short duration, and a remaining portion 304 that includes long frames F and G, which are of much longer duration than a micro frame.

In some embodiments, the length of each of the micro frames A, B, C, D, and E is 400 microseconds, and the length of the remaining portion 304 is substantially 39,667 microseconds, corresponding to a cinematic frame rate of ¹⁄₂₄$^{th}$ of a second, or a total macro frame duration of 41,666.67 microseconds. For duration examples, see FIG. 10.

The micro frames A, B, C, D, and E are chosen to be in sequence, and to be of short duration so as to provide minimal motion offset among the images captured within the sequence of five micro frames 302.

Each macro frame 306 is recorded in sequence to form a sequence of macro frames 322.

The camera 106 (shown in FIG. 1) is configured to record a sequence of five micro frames 302, for example, for each macro frame 306. And then for the remainder 304 of the macro frame, possibly also record a long frame F, and further possibly a long frame G, during that macro frame 306. The duration of the sequence of five micro frames 302 begins at the start of the first micro frame 310 and ends at the end of the last micro frame 312.

In some embodiments, the duration of the sequence of five micro frames 302 is less than 5 milliseconds. In the case of a sequence of 1 to ten micro frames, the duration of such a sequence is typically 0.2 to 10 milliseconds. In the case of a sequence of thirty micro frames, the duration of such a sequence is typically less than 30 milliseconds.

The shortness of the duration of the sequence of five micro frames 302 is chosen to reduce motion artifacts, determined by the motion characteristics of the subject being filmed. The more micro frames in the sequence, the more likely motion blur and motion offset will be introduced.

In some embodiments, the controller 104 is configured to actuate the plurality of lighting setups (e.g., 108, 110, 112) in sequence in accordance with the timing signals provided by the camera 106, such that a first lighting setup 108 of the plurality of lighting setups is actuated by a timing signal after a beginning of a macro frame, and a last lighting setup 112 of the plurality of lighting setups is actuated by a timing signal such that the last lighting setup will go dark before an end of the macro frame.

In some embodiments, the timing signals for the micro frames and the long frames are derived from the camera 106, where the timing signals for the short and long micro frames are set in the camera, and provided by the camera 106 to the controller 104, which in turn controls the lighting setups 108, 110, 112, for example.

Figure 4A:
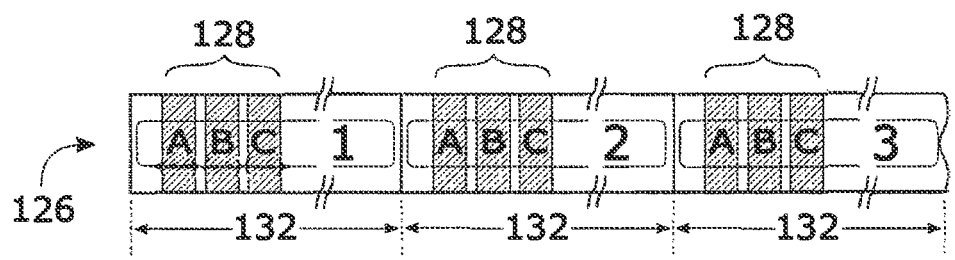
FIG. 4A is a frame sequence diagram of a sequence of three macro frames recorded at a standard cinematic frame rate, each macro frame including a sequence of three micro frames, the macro frames having short-duration lighting intervals that are suitable for a slow-speed motion of the filmed scene.

With reference to FIG. 4A, a frame sequence diagram is shown of a sequence of macro frames 132, starting with the sequence 126 of three macro frames 132. The sequence 126 of macro frames 132 is recorded at a standard cinematic frame rate. Each macro frame 132 includes a burst sequence of micro frames 128, each micro frame 128 being capable of capturing strobed lighting of a duration that is suitable for slow-speed cinematic motion of the filmed scene 102 (shown in FIG. 1). In some embodiments, a standard cinematic frame rate of 24 FPS (frames per second) can be used.

Each macro frame 132 includes a sequence of three micro frames A B C 128 and one long frame (1, 2, 3), the micro frames A B C 128 corresponding to short duration lighting intervals that substantially minimize visual artifacts (such as motion offset between the micro frames A, B, and C corresponding to the three lighting setups) when post processing the sequence of macro frames 126, if slow-speed motion is present in the scene 102.

Figure 4B:
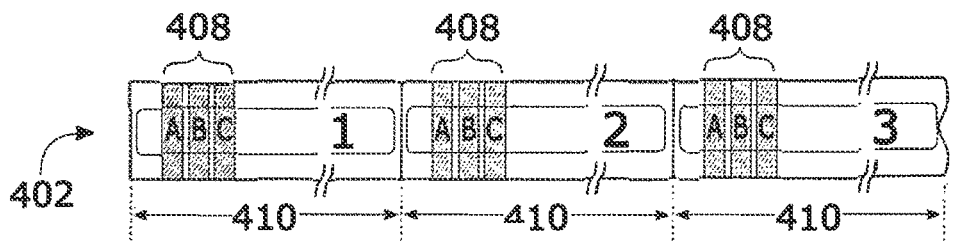
FIG. 4B is a frame sequence diagram of a sequence of three macro frames recorded at a standard cinematic frame rate, each macro frame including a sequence of three micro frames, the macro frames having short-duration lighting intervals that are suitable for a standard-speed motion of the filmed scene.

With reference to FIG. 4B, a schematic diagram is shown of a sequence 402 of macro frames 410, recorded at a standard cinematic frame rate, and with a short duration sequence of micro frames A B C 408 that is suitable for standard-speed cinematic motion of the filmed scene 102 (shown in FIG. 1).

Each macro frame 410 includes a sequence of three micro frames A B C 408 and one long frame (1, 2, 3), the micro frames A B C corresponding to short duration lighting intervals that substantially minimize visual artifacts (such as motion offset between the micro frames A, B, and C corresponding to the three lighting setups) when post processing the sequence of macro frames 402, if standard-speed motion is present in the scene 102.

Figure 4C:
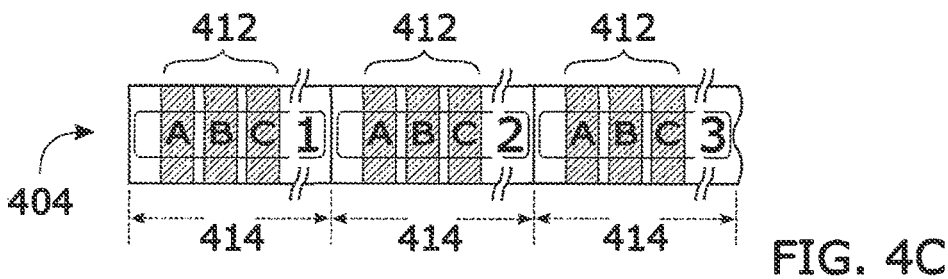
FIG. 4C is a frame sequence diagram of a sequence of three macro frames recorded at a rapid cinematic frame rate, each macro frame including a sequence of three micro frames, the macro frames having short-duration lighting intervals that are suitable for a slow-speed motion of the filmed scene.

With reference to FIG. 4C, a schematic diagram is shown of the sequence 404 of macro frames 414, recorded at a rapid cinematic frame rate, and with a short duration sequence of micro frames A B C 412 that is suitable for slow-speed cinematic motion of the filmed scene 102 (shown in FIG. 1). In some embodiments, the rapid cinematic frame rate can be 30 FPS, 48 FPS, or 60 FPS.

Each macro frame 414 includes a sequence of three micro frames A B C 412 and one long frame (1, 2, 3), the micro frames A B C corresponding to short duration lighting intervals that substantially minimize visual artifacts (such as motion offset between the micro frames A, B, and C corresponding to the three lighting setups) when post processing the sequence of macro frames 404, if slow-speed motion is present in the scene 102.

Figure 4D:
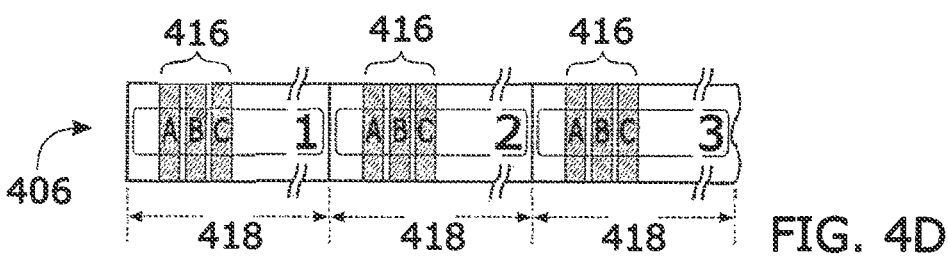
FIG. 4D is a frame sequence diagram of a sequence of three macro frames recorded at a rapid cinematic frame rate, each macro frame including a sequence of three micro frames, the macro frames having short-duration lighting intervals that are suitable for a standard-speed motion of the filmed scene.

With reference to FIG. 4D, a schematic diagram is shown of a sequence 406 of macro frames 418, recorded at a rapid cinematic frame rate, and with a short duration sequence of micro frames A B C 416 that is suitable for standard-speed cinematic motion of the filmed scene 102 (shown in FIG. 1).

Each macro frame 418 includes a sequence of three micro frames A B C 416 and one long frame (1, 2, 3), the micro frames A B C corresponding to short duration lighting intervals that substantially minimize visual artifacts (such as motion offset between the micro frames A, B, and C corresponding to the three lighting setups) when post processing the sequence of macro frames 406, if standard-speed motion is present in the scene 102.

Figure 5:
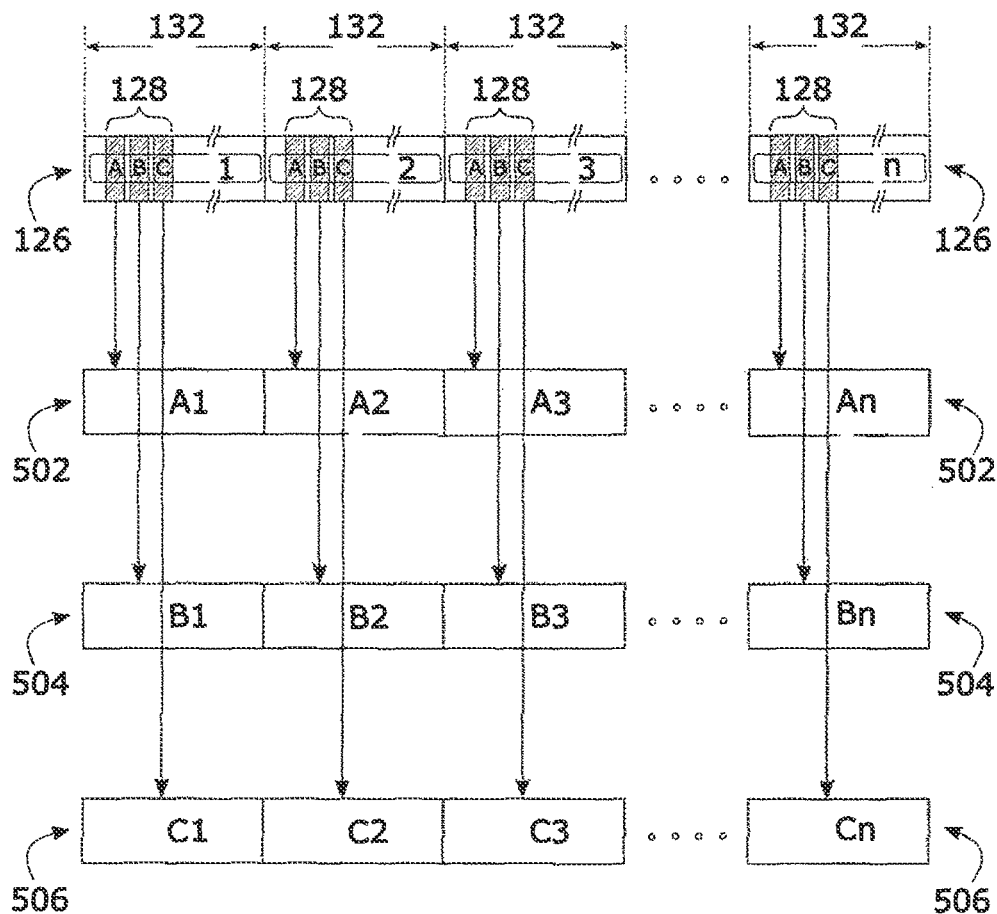
FIG. 5 is a frame sequence diagram showing how to process footage of a scene illuminated sequentially by three lighting setups so as to produce three respective clips of footage of the scene, each clip of footage showing the scene illuminated by one of the three lighting setups.

With reference to FIG. 5, a schematic diagram showing how to process footage of a scene illuminated sequentially by three lighting setups into three individual clips is shown. Each macro frame 132 includes the sequence of micro frames A B C 128 having a short-duration, and one long frame (1, 2, 3), and each macro frame 132 including the micro frames A, B, and C corresponding to the three lighting setups. The sequence of macro frames 126 includes individual macro frames 132 numbered 1 through n, where n is the number of macro frames 132, and n is also equal to the number of frames in the processed film clips.

The sequence of macro frames 126 produce three respective pieces of footage of the scene 102 (shown in FIG. 1), each piece of footage showing the scene illuminated by one of the three lighting setups: the first lighting setup 108, the second lighting setup 110, and the third lighting setup 112 (each shown in FIG. 1). The "A" micro frames producing the "A" frames in a first frame clip 502, the "B" micro frames producing the "B" frames in a second frame clip 504, and the "C" micro frames producing the "C" frames in a third frame clip 506.

Three respective clips 502, 504, 506 of footage of the scene are produced, each clip of footage showing the scene illuminated by one of the three lighting setups.

Figure 6:
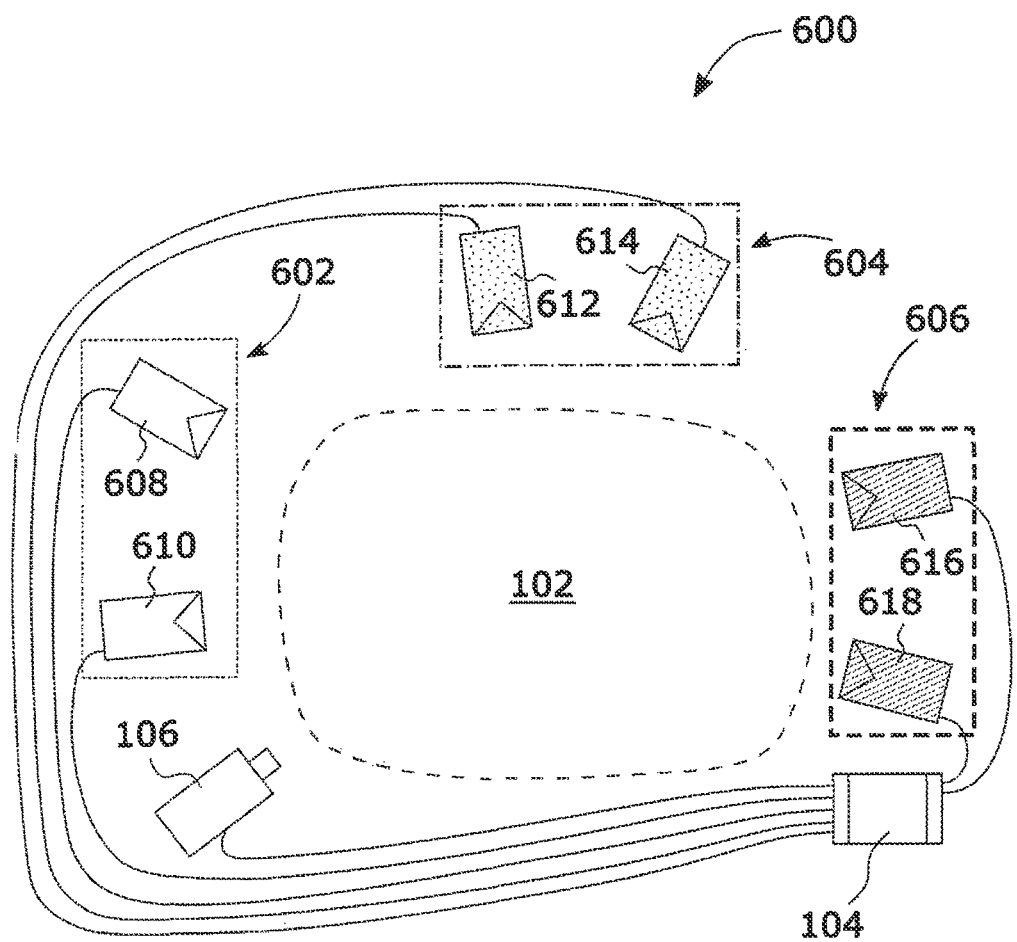
FIG. 6 is a schematic diagram of a scene lit by three lighting setups, each lighting setup having two strobable light sources, and each strobable light source controlled by a controller that receives timing signals from a camera recording the scene so as to provide the three lighting setups.

With reference to FIG. 6, a schematic diagram of a top view of a scene 102 lit with three lighting setups 602, 604, 606 is shown of an apparatus 600 for recording a scene using multiple lighting setups. Included is the controller 104 in communication with the camera 106 configured to record the scene 102. In this embodiment, a light source 608 and a light source 610 are included in a first lighting setup 602 to provide light for the scene 102 at the same time. A light source 612 and a light source 614 are included in a second lighting setup 604 to provide light for the scene 102 at the same time. In addition, a light source 616 and a light source 618 are included in a third lighting setup 606 to provide light for the scene 102 at the same time.

The controller 104 activates the first lighting setup 602 at a time within the "A" micro frames of the sequence of frames 126 (shown in FIG. 1), and the controller 104 activates the second lighting setup 604 within the "B" micro frames of the sequence of frames 126 (shown in FIG. 1). In addition, the controller 104 activates the third lighting setup 606 within the "C" micro frames of the sequence of frames 126 (shown in FIG. 1).

The first lighting setup 602 includes the light source 608 and the light source 610, both synchronized by the controller 104 to provide short duration illumination to the scene 102 at the same time, corresponding to the "A" micro frames in the sequence of frames 126 (shown in FIG. 1).

The second lighting setup 604 includes the light source 612 and the light source 614, both synchronized by the controller 104 to provide short duration illumination to the scene 102 at the same time, corresponding to the "B" micro frames in the sequence of frames 126 (shown in FIG. 1).

The third lighting setup 606 includes the light source 616 and the light source 618, both synchronized by the controller 104 to provide short duration illumination to the scene 102 at the same time, corresponding to the "C" micro frames in the sequence of frames 126 (shown in FIG. 1).

Each light source is controlled by the controller 104 that receives timing signals from the camera 106 recording the scene so as to provide sequential activations to the first lighting setup 602, the second lighting setup 604, and the third lighting setup 606.

Figure 7:
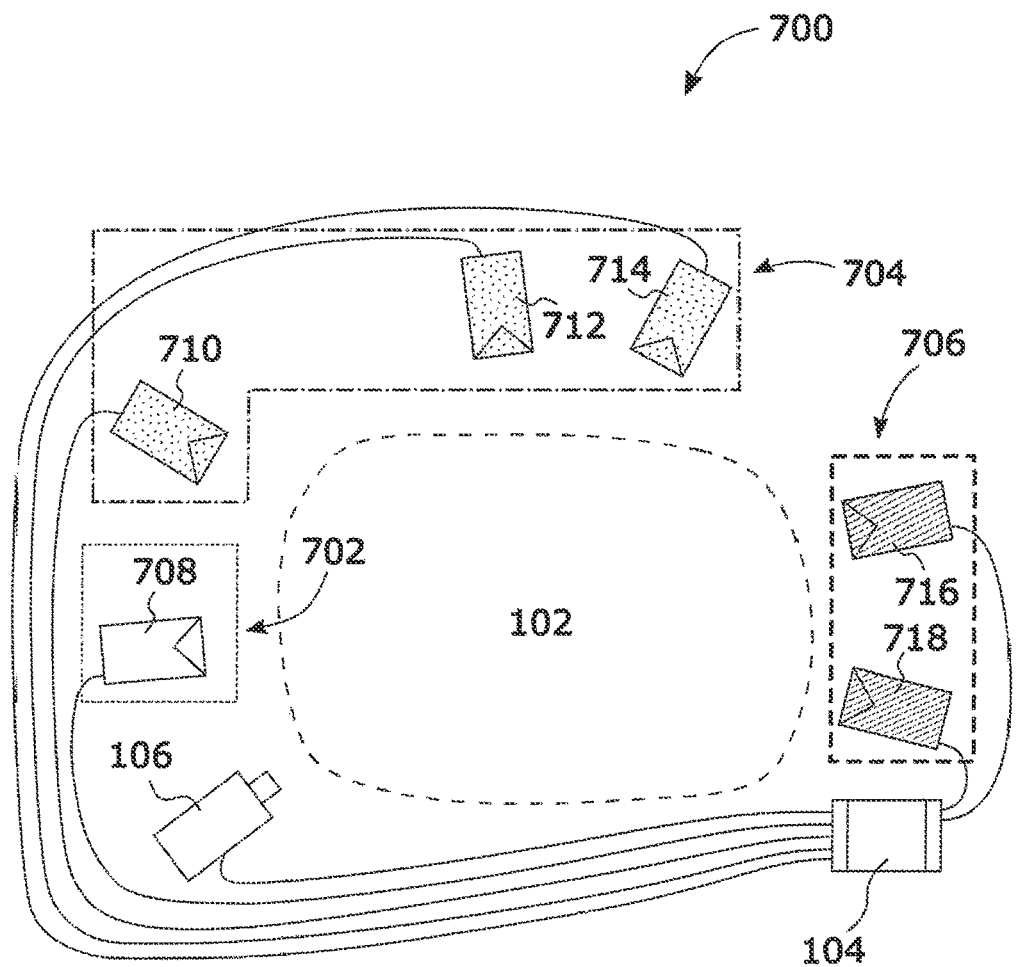
FIG. 7 is a schematic diagram of a scene lit with three lighting setups, a first lighting setup having one strobable light source, a second lighting setup having three strobable light sources, and a third lighting setup having two strobable light sources.

With reference to FIG. 7, a schematic diagram of a top view of a scene 102 lit with three lighting setups 702, 704, 706 is shown of an apparatus 700 for recording a scene using multiple lighting setups. Included is the controller 104 in communication with the camera 106 configured to record the scene 102. In this embodiment, a single light source 708 is included in a first lighting setup 702 to provide light for the scene 102. Three light sources 710, 712, and 714 are included in a second lighting setup 704 to provide light for the scene 102. In addition, two light sources 716 and 718 are included in a third lighting setup 706 to provide light for the scene 102.

The controller 104 activates the first lighting setup 702 at a time within the "A" micro frames of the sequence of frames 126 (shown in FIG. 1), and the controller 104 activates the second lighting setup 704 within the "B" micro frames of the sequence of frames 126 (shown in FIG. 1). In addition, the controller 104 activates the third lighting setup 706 within the "C" micro frames of the sequence of frames 126 (shown in FIG. 1).

The first lighting setup 702 includes the light source 708, synchronized by the controller 104 to provide short duration illumination to the scene 102, corresponding to the "A" micro frames in the sequence of frames 126 (shown in FIG. 1).

The second lighting setup 704 includes the light source 710, the light source 712 and the light source 714, all three synchronized by the controller 104 to provide short duration illumination to the scene 102 at the same time, corresponding to the "B" micro frames in the sequence of frames 126 (shown in FIG. 1).

The third lighting setup 706 includes the light source 716 and the light source 718, both synchronized by the controller 104 to provide short duration illumination to the scene 102 at the same time, corresponding to the "C" micro frames in the sequence of frames 126 (shown in FIG. 1).

Each light source is controlled by the controller 104 that receives timing signals from the camera 106 recording the scene so as to provide sequential activations to the first lighting setup 702, the second lighting setup 704, and the third lighting setup 706.

Figure 8:
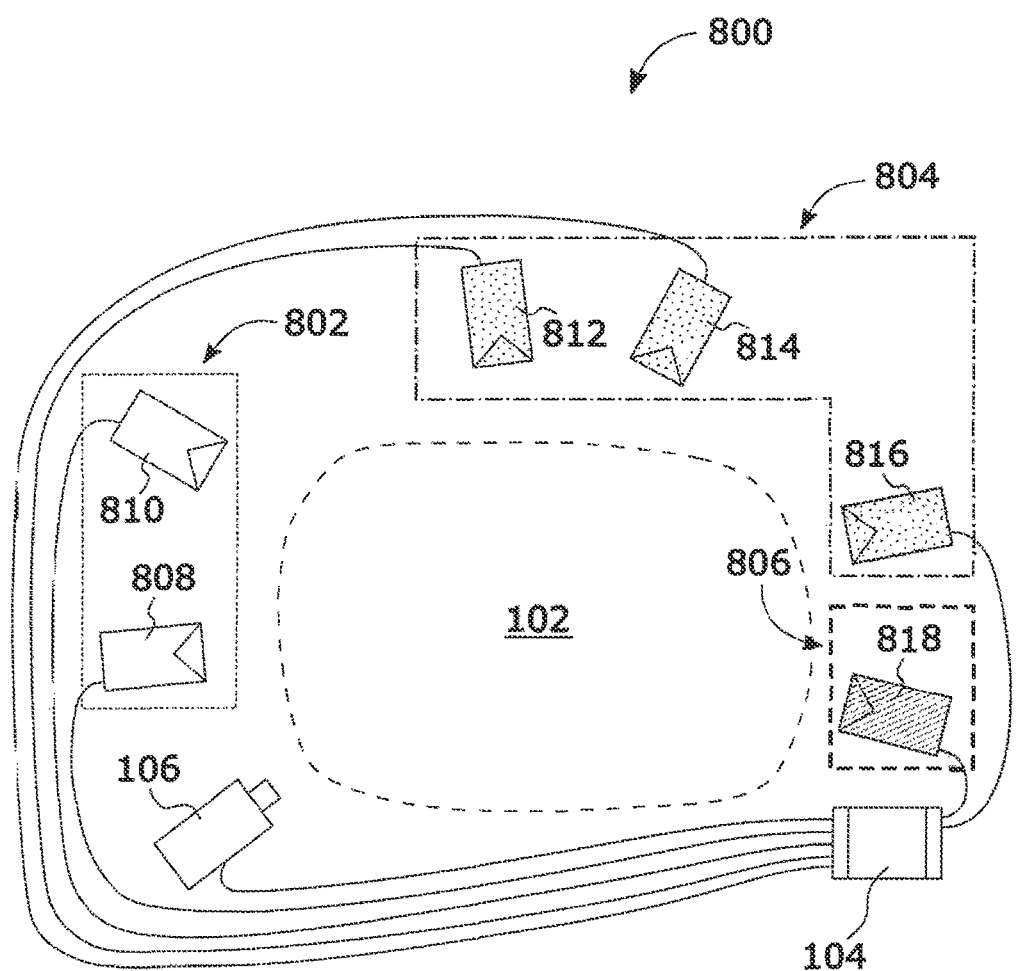
FIG. 8 is a schematic diagram of a scene lit with three lighting setups, the first lighting setup having two strobable light sources, the second lighting setup having three strobable light sources, and the third lighting setup having one strobable light source.

With reference to FIG. 8, a schematic diagram of a top view of a scene 102 lit with three lighting setups 802, 804, 806 is shown of an apparatus 800 for recording a scene using multiple lighting setups. Included is the controller 104 in communication with the camera 106 configured to record the scene 102. In this embodiment, light sources 808 and 810 are included in a first lighting setup 802 to provide light for the scene 102. Light sources 812, 814, and 816 are included in a second lighting setup 804 to provide light for the scene 102. In addition, a single light source 818 is included in a third lighting setup 806 to provide light for the scene 102.

The controller 104 activates the first lighting setup 802 at a time within the "A" micro frames of the sequence of frames 126 (shown in FIG. 1), and the controller 104 activates the second lighting setup 804 within the "B" micro frames of the sequence of frames 126 (shown in FIG. 1). In addition, the controller 104 activates the third lighting setup 806 within the "C" micro frames of the sequence of frames 126 (shown in FIG. 1).

The first lighting setup 802 includes the light source 808 and the light source 810, both synchronized by the controller 104 to provide short duration illumination to the scene 102 at the same time, corresponding to the "A" micro frames in the sequence of frames 126 (shown in FIG. 1).

The second lighting setup 804 includes the light source 812, the light source 814 and the light source 816, all three synchronized by the controller 104 to together provide short duration illumination to the scene 102 at the same time, corresponding to the "B" micro frames in the sequence of frames 126 (shown in FIG. 1).

The third lighting setup 806 includes the light source 818, synchronized by the controller 104 to provide short duration illumination to the scene 102, corresponding to the "C" micro frames in the sequence of frames 126 (shown in FIG. 1).

Each light source is controlled by the controller 104 that receives timing signals from the camera 106 recording the scene so as to provide sequential activations to the first lighting setup 802, the second lighting setup 804, and the third lighting setup 806.

Figure 9:
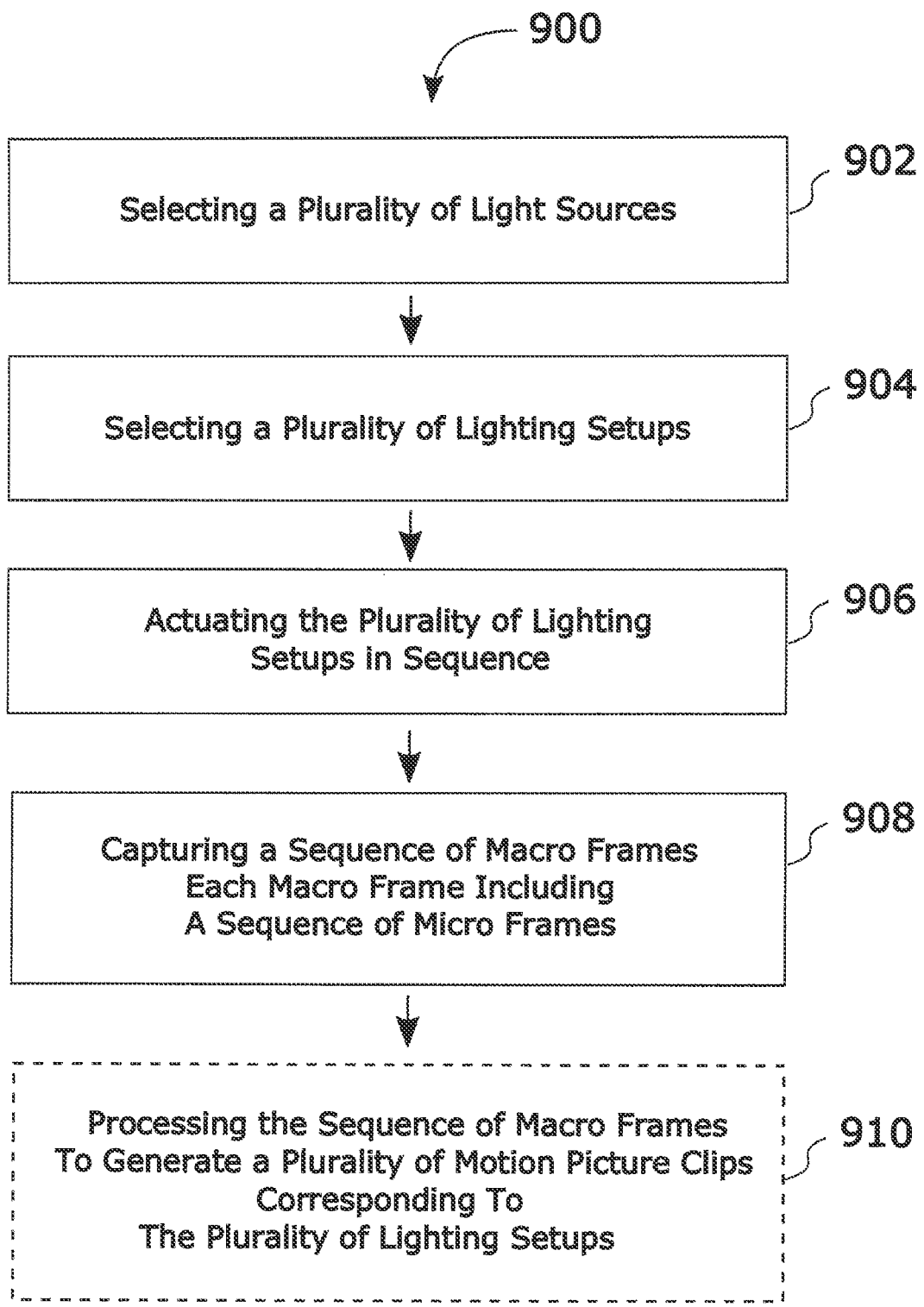
FIG. 9 is a flow chart of a method for recording a scene using a sequence of lighting setups so as to concurrently produce motion picture clips of footage of the scene for each lighting setup, each motion picture clip of footage having minimized time offset with respect to each other.

With reference to FIG. 9, a flow chart is shown for a method 900 for recording a scene using a plurality of lighting setups so as to concurrently produce motion picture footage of the scene for each lighting setup of the scene, the motion picture clips having minimized time offset with respect to each other.

The method includes selecting 902 a plurality of light sources, with each light source configured to illuminate the scene 102 (shown in FIG. 1).

Next, the method 900 includes selecting 904 a plurality of lighting setups from the plurality of light sources, and then actuating 906 the plurality of lighting setups in sequence from the plurality of light sources. Each lighting setup can be selected so as to be different from the other lighting setups, or two lighting setups can share one or more light sources in common.

The method 900 next includes capturing 908 a sequence of macro frames, each macro frame including a sequence of micro frames, in accordance with timing signals, including actuating each lighting setup corresponding to each micro frame, in the sequence of micro frames within each macro frame.

Optionally, the method 900 may also include processing 910 the sequence of macro frames to generate a plurality of motion picture clips corresponding to the plurality of lighting setups. $\frac{1}{60}^{th}$ of a second is a common threshold whereby a number of everyday types of motions appear frozen at this recording speed or faster. At a frame rate of 60 FPS, each frame has a duration of $\frac{1}{60}^{th}$ of a second, equal to 16.6667 milliseconds.

Figure 10:
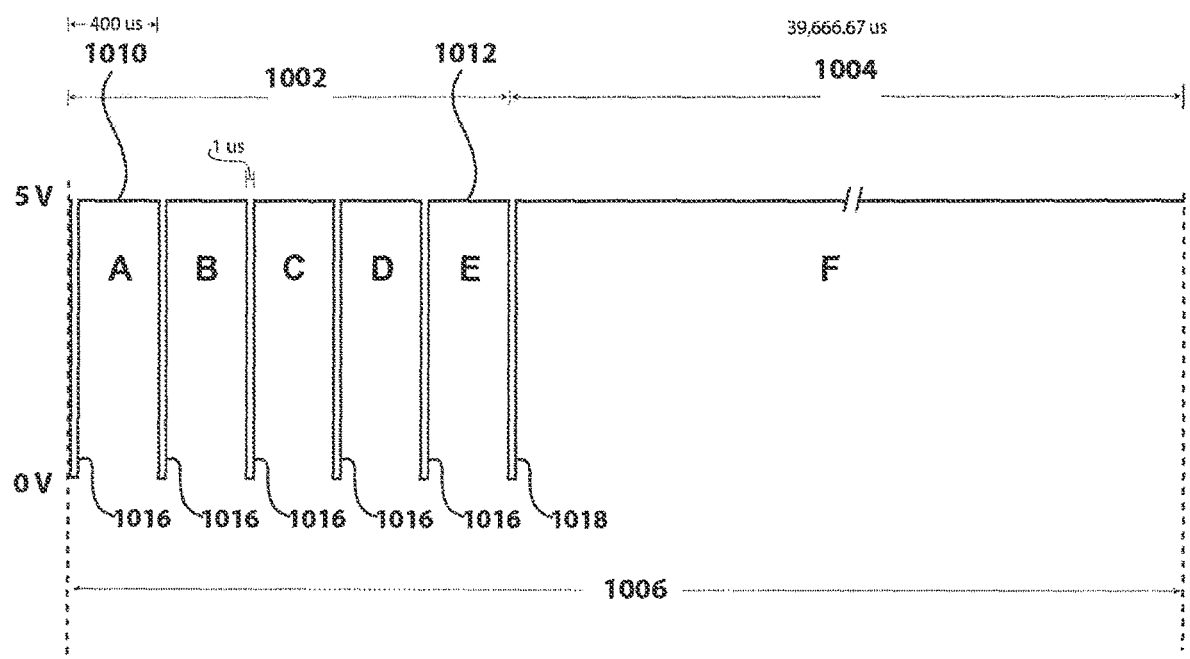
FIG. 10 is a timing diagram showing some exemplary timing values.

Referring to FIG. 10, a timing diagram is presented showing some exemplary timing values. For example, the micro frame A can be 400 microseconds. The pulse 1016 can be 1 microsecond, and the long frame F can be 39, 666.67 microseconds.

Figure 11:
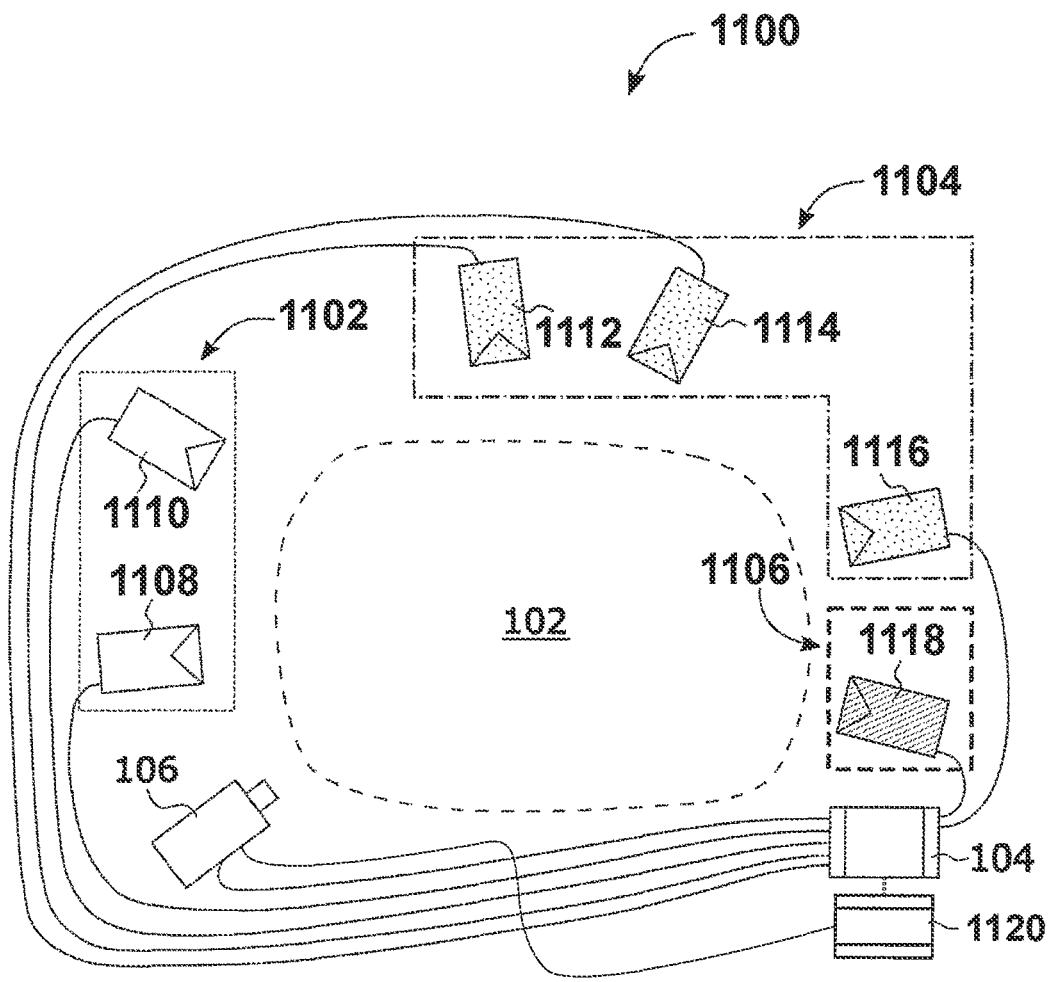
FIG. 11 is a schematic diagram of a scene illuminated sequentially by the three lighting setups of FIG. 8, further including an external controller that provides timing signals to both the camera and the controller.

With reference to FIG. 11, a scene 102 is illuminated sequentially by the three lighting setups 1102, 1104, 1106, further including an external controller 1120 that provides timing signals to both the camera 106 and the controller 104.

Instead of using the internal settings of the camera 106, an external controller 1120 can serve as a signal generator to provide a signal to the camera 106 which determines the timings of the macro and micro frames. One example of this is a waveform generator (such as the Keysight™ 33511 B) which, when attached with a BNC cable, to the F-Sync connector on a high speed camera such as the Vision Research™ v2460, can supply the necessary signal. In the example of the Keysight™ 33511 B, the signal is a 5V signal which drops to 0V for at least one microsecond to close out the previous frame and to cause a new frame to start. The signal then returns to 5V.

For example, FIG. 10 shows one cycle of the signal from the waveform generator as it is provided to the camera so as to fire five micro frames, each micro frame being of a duration of 400 microseconds, and one longer frame lasting 39,666.67 microseconds. These frames give a combined macro frame with a duration of 1/24th of a second. This signal is sent through repeatedly for the number of iterations to run the camera for the desired shot length.

For example, to run the camera for a 10 second shot, the signal in FIG. 10 would be repeated 240 times (as each repetition is 1/24th of a second). In this example, as shown in FIG. 11, the waveform generator serves as an external controller 1120 that is connected to the camera 106, and provides a stream of timing signals to the camera 106.

In other embodiments, the external controller 1120 can be a 'custom controller' or other device generating timing signals, including the F-sync type outlined above, and others commonly used in the industry such as Genlock™ (Tri Level, BiLevel), FrameSync™, Strobe Signal, or IRIG. In addition to sending signals directly to the camera, 1120 can also be connected directly to the main system controller 104 (shown as a dashed line between 1120 and 104 in FIG. 11). In this way, the external controller 1120 can send signals to the camera 106 and to the main system controller 104. Alternatively, the external controller 1120 and the main system controller 104 can operate in tandem, exchanging signals with the camera 106 and sending signals to the lights to fire.

Thus, in some embodiments, the timing signals are derived from the external controller 1120 that controls the camera 106, and the camera 106 controls the lighting setups 108, 110, 112.

This can be done in a variety of ways which involve the system controller 104 and/or the external controller 1120:

An external controller 1120 generates signals for the micro frames and the long frames which are sent to the camera 106, which sends them on to the system controller 104.

An external controller 1120 generates signals for the micro frames and the long frames which are sent both to the camera 106 and to the system controller 104.

An external controller 1120 generates signals for the micro frames and the long frames which are sent to the camera 106, and in unison with these timing signals it also signals the lights to fire. Thus, there is only one controller (external controller 1120) which sends signals directly to the camera and to the lights.

An external controller 1120 generates signals for the micro frames and the long frames which are sent to the camera 106. The camera 106 sends a signal back to the external controller 1120, which then uses that signal as the basis for sending signals to the lights to fire. Thus, there is only one controller (external controller 1120) which sends signals directly to the camera and to the lights.

In some embodiments, the lights receive signals from the external controller 1120 or the controller 104 to trigger at a FPS (frame rate) that is a multiple of the FPS (frame rate) at which the camera 106 is recording. Thus, the lights can operate at a firing rate which is a multiple of the camera frame rate. For example, the camera 106 can run at 24 FPS, while the lights are still synced as explained above, but run at a rate of 96 FPS.

Figure 12:
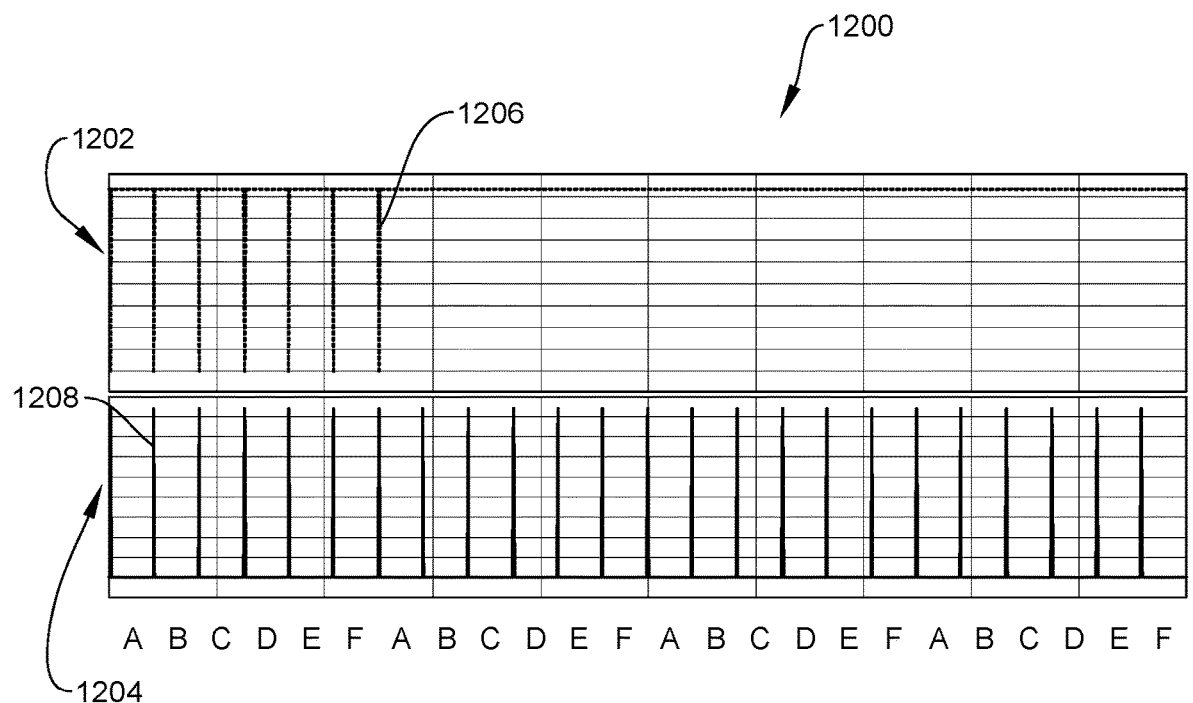
FIG. 12 is a timing diagram of a macro frame showing a top signal representing the timing of a burst sequence of image captures, and showing a bottom signal representing a repeating sequence of actuations of a plurality of strobable lighting setups, the relative timing of the image captures (micro frames) and the actuations of the strobable lighting setups being synchronized such that one strobable lighting setup fires in synchrony with each micro frame at the global rate, and then the lighting setup sequence continues to fire three more times until the end of the macro frame.

With reference to FIG. 12, two signals 1202 and 1204 (representing initiation of a sequence of micro frames 1202, and a sequence of lighting sequences 1204, respectively) extend over the duration of a macro frame 1200, the duration of the macro frame 1200 being 1/24th of a second=41.67 milliseconds, for example. Other macro frame durations are possible, such as 1/36th, 1/48th, and 1/60$^{th}$ of a second, for example. The top signal 1202 is the signal that determines when each micro frame (image captures) occurs. The six downward spikes 1206 in the top signal 1202 represent the start of each of six micro frames (image captures) that occur at the start of each macro frame 1200.

The bottom signal 1204 is the signal that determines when each one (A, B, C, D, E, F) of a plurality of lighting setups will fire in sequence. In this example, there are four sets of six upward spikes 1208 within each macro frame 1200, each upward spike 1208 causing the firing of one of the six lighting setups (A, B, C, D, E, F) in the lighting sequence.

Thus, the lighting sequence will be performed four times each macro frame 1200, and therefore each of the six lighting setups (A, B, C, D, E, F) will fire four times per macro frame 1200, giving an effective strobe firing rate of 96 Hertz, where the scene is lit 96 times per second, each of the six lighting setups firing in sequence, the lighting sequence repeating four times per macro frame 1200.

By contrast, the image captures (micro frames) occur as a burst of six image captures, each image capture being taken at the same time that one of the lighting setups (A, B, C, D, E, F) of the lighting sequence is fired. Thus, the image captures occur only during the first repetition of the lighting sequence, and no images are acquired during the remaining three repetitions of the lighting sequence.

In this way, the scene is lit by one of the lighting setups in a repeating lighting sequence at a rate (96 Hertz) that is greater than the perceivable flicker rate (70 Hertz), while the image captures occur once per lighting setup only during the first repetition of the lighting sequence. Each image capture during a micro frame is timed to occur during the firing of one of the lighting setups (A, B, C, D, E, F) of the lighting sequence.

Figure 13:
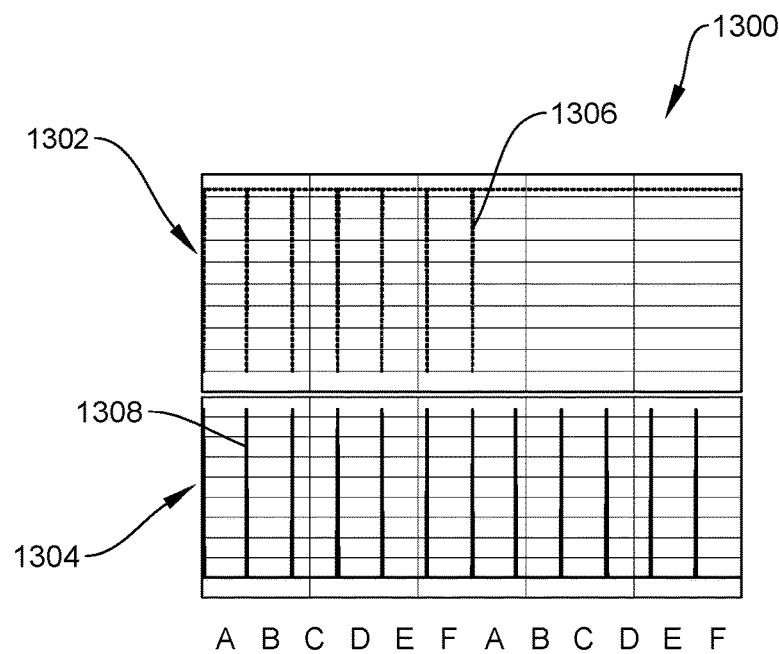
FIG. 13 is a timing diagram of a macro frame half the duration of the macro frame of FIG. 12, showing a top signal representing the timing of a burst sequence of image captures, the burst sequence being of the same duration as shown in FIG. 12, and showing a bottom signal representing a sequence of actuations of a plurality of strobable lighting setups, the sequence of strobable lighting setups firing only one more time until the end of the macro frame.

With reference to FIG. 13, a second macro frame 1300 is shown having a frame rate that is twice as rapid as the frame rate of FIG. 12, i.e., the macro frame 1300 shown is half the duration of the macro frame 1200 of FIG. 12. Thus, the two signals 1302 and 1304 representing the micro frames and lighting sequences extend over 1/48th of a second=20.83 milliseconds, the duration of each macro frame. The top signal 1302 is the signal that determines when the micro frames (image captures) occur. The six downward spikes 1306 in the top signal 1302 represent the start of the six micro frames (image captures) that occur within the first half of the macro frame 1300.

The bottom signal 1304 is the signal that determines when each one of the plurality of lighting setups (A, B, C, D, E, F) will fire in sequence. In this example, there are two sets of six upward spikes 1308 within each macro frame, each upward spike 1308 causing the firing of one of the six lighting setups (A, B, C, D, E, F) in the lighting sequence.

Thus, each of the six lighting setups (A, B, C, D, E, F) will fire two times per macro frame 1300 (¼8th of a second duration), again giving an effective strobe firing rate of 96 Hertz, where the scene is lit 96 times per second, each of the six lighting setups firing in sequence, the lighting sequence repeating two times per macro frame 1300.

By contrast, the image captures (micro frames) occur as a burst of six image captures, each image capture being taken at the same time as one of the lighting setups of the lighting sequence is fired. The image captures occur only during the first repetition of the lighting sequence, and no images are acquired during the second repetition of the lighting sequence.

In this way, the scene is lit by one of the lighting setups in a repeating lighting sequence at a rate greater than the perceivable flicker rate, while the image captures occur once per lighting setup only during the first repetition of the lighting sequence.

Other modifications and implementations will occur to those skilled in the art without departing from the spirit and the scope of the invention as claimed. Accordingly, the above description is not intended to limit the invention, except as indicated in the following claims.

What is claimed is:

1. An apparatus for filming a scene using a sequence of lighting setups so as to acquire simultaneously a respective plurality of motion picture clips of the scene, such that on-set viewers of the scene perceive apparently continuous (non-flickering) illumination, the apparatus comprising:
   a plurality of strobable light sources, each strobable light source configured to be capable of illuminating at least part of the scene;
   a camera configured to capture a burst sequence of images at a global frequency, the global frequency being a product of the number of lighting setups, the number of repetitions of each lighting setup per macro frame, and the number of macro frames per second, each image of the sequence of images being captured during a respective micro frame of a sequence of micro frames, each sequence of micro frames occurring within only a part of each macro frame of a sequence of macro frames, each micro frame initiated by a micro frame timing signal, and each image of the sequence of images resulting from illuminating the scene with a respective lighting setup of a sequence of lighting setups,
   the camera also configured to include at least one long micro frame after capturing the sequence of micro frames, the at least one long micro frame being of an extended duration, the at least one long micro frame being configured to be either recorded or not, and when recorded, the at least one long micro frame being configured to capture light from a continuous light source; and
   a controller configured to:
      enable a user to define a plurality of lighting setups using the plurality of light sources, and
      actuate the plurality of lighting setups in accordance with the micro frame timing signals so as to first actuate a sequence of lighting setups in synchrony with the sequence of micro frames within each macro frame, and then repeating the sequence of lighting setups for the remainder of each macro frame.

2. The apparatus of claim 1, wherein each sequence of micro frames is of a duration of no more than substantially 21 milliseconds.

3. The apparatus of claim 1, wherein the GLOBAL frequency is greater than 70 Hertz, and each sequence of lighting setups is actuated at the GLOBAL frequency more than once throughout each macro frame, thereby substantially eliminating flicker visible to persons viewing the scene on set during filming.

4. The apparatus of claim 3, wherein the duration of the macro frame is ¼24th of a second, and each micro frame corresponding to a lighting setup can be used to create footage with an apparent 24 fps capture speed.

5. The apparatus of claim 3, wherein the duration of the macro frame is ¼8th of a second, and each micro frame corresponding to a lighting setup can be used to create footage with an apparent 48 fps capture speed.

6. The apparatus of claim 3, wherein the duration of the macro frame is 1/Nth of a second, and each micro frame corresponding to a lighting setup can be used to create footage with an apparent N fps capture speed.

7. The apparatus of claim 1, further comprising:
   a processing module configured to assemble a plurality of motion picture clips, each motion picture clip assembled from a sequence of corresponding micro frames of the sequence of macro frames,
   each motion picture clip corresponding to one of the lighting setups.

8. The apparatus of claim 1, wherein the controller is configured to actuate the plurality of lighting setups in sequence in accordance with the micro frame timing signals,
   such that a first lighting setup of the plurality of lighting setups is actuated by a micro frame timing signal upon a beginning of a macro frame, and
   a last lighting setup of the plurality of lighting setups is actuated by a micro frame timing signal such that the last lighting setup will go dark before an end of the macro frame.

9. A method for filming a scene using a sequence of lighting setups so as to acquire simultaneously a respective plurality of motion picture clips of the scene, such that on-set viewers of the scene perceive apparently continuous (non-flickering) illumination, the method comprising:
   using a plurality of strobable light sources to illuminate at least part of the scene;
   using a camera to capture a burst sequence of images at a global frequency, the global frequency being a product of the number of lighting setups, the number of repetitions of each lighting-setup per macro frame, and the number of macro frames per second, each image of the sequence of images being captured during a respective micro frame of a sequence of micro frames, each sequence of micro frames occurring within only a part of each macro frame of a sequence of macro frames, each micro frame initiated by a micro frame timing signal, and each image of the sequence of images resulting from illuminating the scene with a respective lighting setup of a sequence of lighting setups,
   the camera also configured to include at least one long micro frame after capturing the sequence of micro frames, the at least one long micro frame being of an extended duration, the at least one long micro frame being configured to be either recorded or not, and when recorded, the at least one long micro frame being configured to capture light from a continuous light source; and
   using a controller to:

enable a user to define a plurality of lighting setups using the plurality of light sources, and actuate the plurality of lighting setups in accordance with the micro frame timing signals so as to first actuate a sequence of lighting setups in synchrony with the sequence of micro frames within each macro frame, and then repeating the sequence of lighting setups for the remainder of each macro frame.

10. The method of claim 1, wherein each sequence of micro frames is of a duration of no more than substantially 21 milliseconds.

11. The method of claim 9, wherein the GLOBAL frequency is greater than 70 Hertz, and each sequence of lighting setups is actuated at the GLOBAL frequency more than once throughout each macro frame, thereby substantially eliminating flicker visible to persons viewing the scene on set during filming.

12. The method of claim 11, wherein the duration of the macro frame is 1/24th of a second, and each micro frame corresponding to a lighting setup can be used to create footage with an apparent 24 fps capture speed.

13. The method of claim 11, wherein the duration of the macro frame is 1/48th of a second, and each micro frame corresponding to a lighting setup can be used to create footage with an apparent 48 fps capture speed.

14. The method of claim 11, wherein the duration of the macro frame is 1/Nth of a second, and each micro frame corresponding to a lighting setup can be used to create footage with an apparent N fps capture speed.

15. The method of claim 9, further comprising:
using a processing module to assemble a plurality of motion picture clips,
each motion picture clip assembled from a sequence of corresponding micro frames of the sequence of macro frames,
each motion picture clip corresponding to one of the lighting setups.

16. The method of claim 9, wherein the controller actuates the plurality of lighting setups in sequence in accordance with the micro frame timing signals,
such that a first lighting setup of the plurality of lighting setups is actuated by a micro frame timing signal upon a beginning of a macro frame, and
a last lighting setup of the plurality of lighting setups is actuated by a micro frame timing signal such that the last lighting setup will go dark before an end of the macro frame.

* * * * *